(12) United States Patent
Kitagawa et al.

(10) Patent No.: US 11,564,189 B2
(45) Date of Patent: Jan. 24, 2023

(54) ELECTRONIC APPARATUS, ELECTRONIC SYSTEM, AND METHOD

(71) Applicant: KABUSHIKI KAISHA TOSHIBA, Tokyo (JP)

(72) Inventors: Hiroyuki Kitagawa, Tokyo (JP); Koji Akita, Kanagawa (JP); Yukako Tsutumi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 41 days.

(21) Appl. No.: 17/198,155

(22) Filed: Mar. 10, 2021

(65) Prior Publication Data

US 2022/0007317 A1 Jan. 6, 2022

(30) Foreign Application Priority Data

Jul. 2, 2020 (JP) .............................. JP2020-114717

(51) Int. Cl.
*H04W 56/00* (2009.01)
(52) U.S. Cl.
CPC ................................ *H04W 56/003* (2013.01)
(58) Field of Classification Search
CPC ............... H04W 56/003; H04W 56/00; H04W 56/0045; H04B 7/2662; H04J 2011/0096
See application file for complete search history.

(56) References Cited

U.S. PATENT DOCUMENTS

| 5,955,618 A * | 9/1999 | Kim ........................ H04N 5/08 348/495 |
| 10,373,654 B1 * | 8/2019 | Vankayala .......... H01L 25/0657 |
| 2005/0151532 A1 * | 7/2005 | Seki ..................... G01R 21/133 324/76.39 |
| 2012/0207138 A1 | 8/2012 | Korn et al. |
| 2019/0312537 A1 | 10/2019 | Samuel et al. |
| 2021/0217530 A1 * | 7/2021 | Sato ....................... G16H 50/30 |

FOREIGN PATENT DOCUMENTS

| JP | 2013507897 A | 3/2013 |
| JP | 2019536417 A | 12/2019 |

\* cited by examiner

*Primary Examiner* — Hassan A Phillips
*Assistant Examiner* — Prenell P Jones
(74) *Attorney, Agent, or Firm* — Holtz, Holtz & Volek PC

(57) ABSTRACT

According to one embodiment, an electronic apparatus controls an operation of a control target device. The electronic apparatus is configured to generate a first timing signal, to delay the first timing signal by a first time and to generate a second timing signal for defining a transmission timing of control data related to control of the operation of the control target device, to transmit a data signal including the control data based on the second timing signal, to receive the data signal and to generate a third timing signal for a notification of reception of the data signal, and, to generate a fourth timing signal indicating a control timing of the control target device based on the control data, based on the third timing signal.

13 Claims, 8 Drawing Sheets

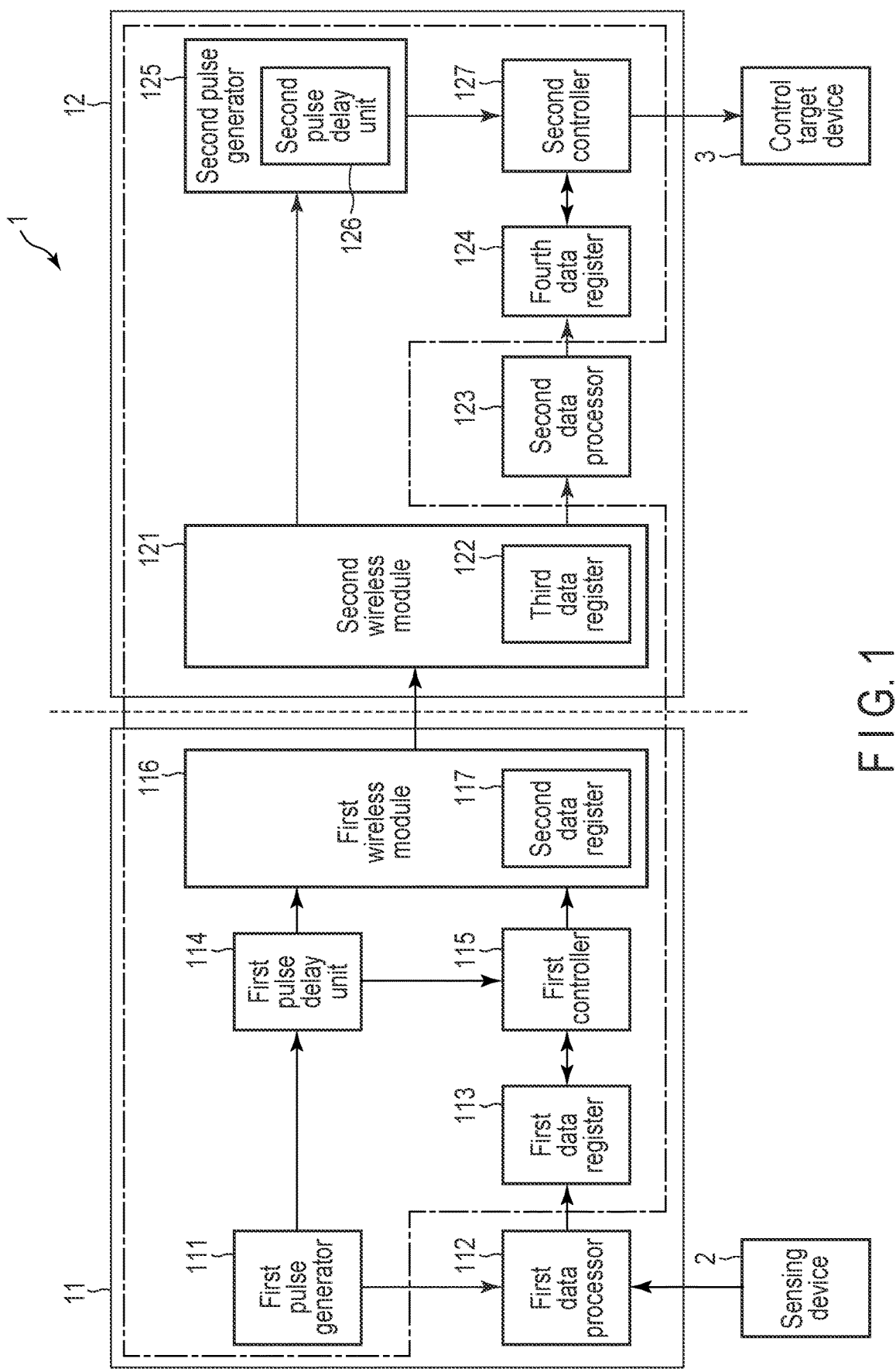
F I G. 1

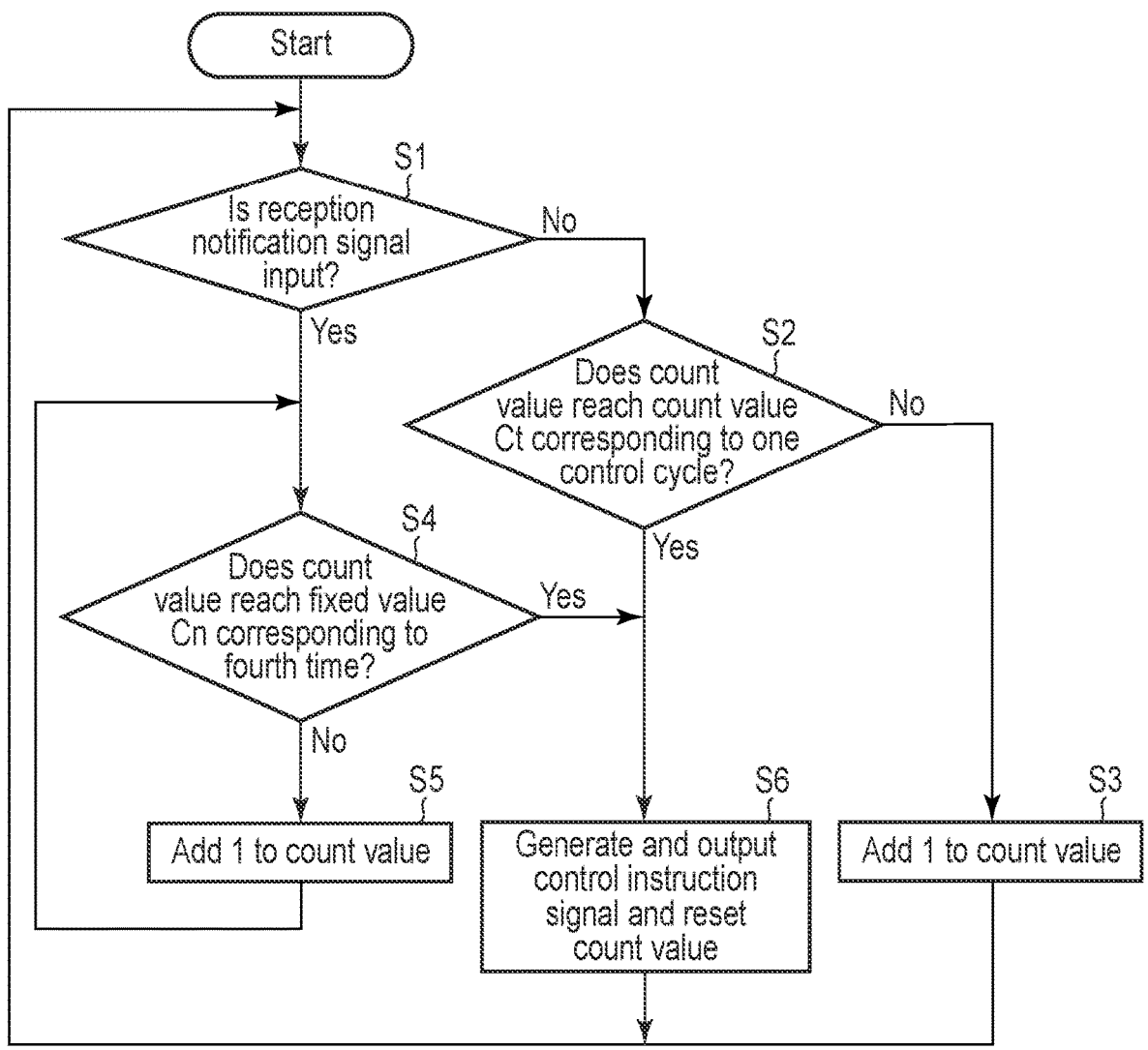
F I G. 3

ELECTRONIC APPARATUS, ELECTRONIC SYSTEM, AND METHOD

CROSS-REFERENCE TO RELATED APPLICATIONS

This application is based upon and claims the benefit of priority from Japanese Patent Application No. 2020-114717, filed Jul. 2, 2020, the entire contents of which are incorporated herein by reference.

FIELD

Embodiments described herein relate generally to an electronic apparatus, an electronic system, and a method.

BACKGROUND

In recent years, technologies of controlling devices such as power converters and robots of which a control timing is important, by using wireless communication, have been developed. More specifically, a technology as follows has been developed: wireless communication is performed between a first wireless device that functions as a control master and a second wireless device that functions as a slave, and the second wireless device that receives an instruction from the first wireless device controls a control target device such as a power converter or a robot.

In the above-described technology, in order to control the control target device, it is necessary to synchronize the internal clocks of the first wireless device and the second wireless device to match control timings. Such a synchronization process is performed, for example, using CPUs provided in the first wireless device and the second wireless device.

However, the CPUs of the first wireless device and the second wireless device may be interrupted by various processes such as an interrupt process by reception of a wireless signal, a timer interrupt process by an external device, and an interrupt process by a watchdog timer. With such an interrupt process, there are concerns that the above-described synchronization process is not normally executed, and the synchronization accuracy between the first wireless device and the second wireless device is deteriorated.

BRIEF DESCRIPTION OF THE DRAWINGS

FIG. 1 is a schematic block diagram illustrating a configuration example of an electronic apparatus according to an embodiment.

FIG. 3 is a flowchart illustrating an example of a procedure of a first pulse generation process executed by the wireless receiver according to the embodiment.

DETAILED DESCRIPTION

Figure 2:
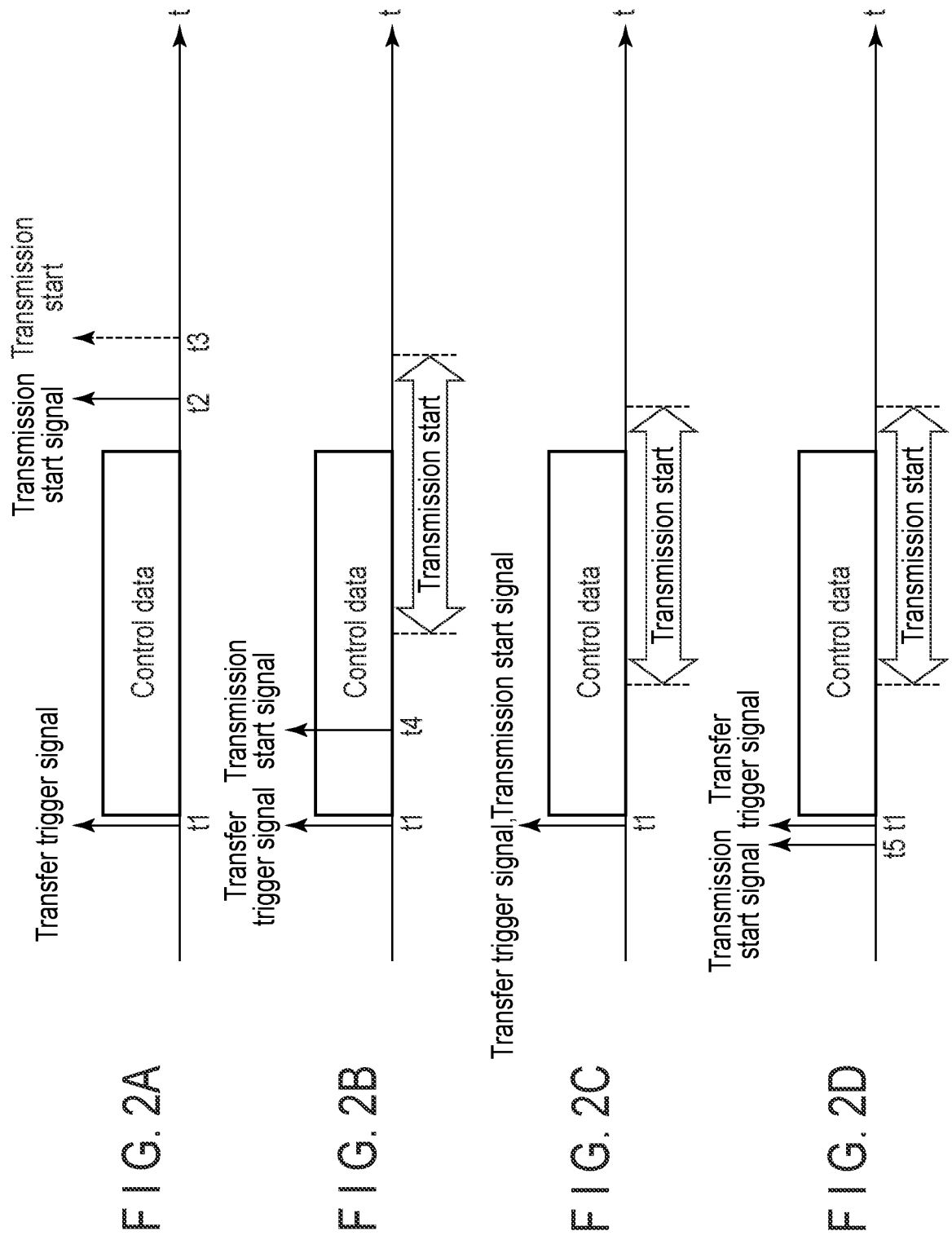
FIG. 2A is a diagram illustrating a timing at which a wireless transmitter starts transmission of a signal including control data to a wireless receiver, according to the embodiment.
FIG. 2B is a diagram illustrating a timing at which a wireless transmitter starts transmission of a signal including control data to a wireless receiver, according to the embodiment.
FIG. 2C is a diagram illustrating a timing at which a wireless transmitter starts transmission of a signal including control data to a wireless receiver, according to the embodiment.
FIG. 2D is a diagram illustrating a timing at which a wireless transmitter starts transmission of a signal including control data to a wireless receiver, according to the embodiment.

Embodiments will be described with reference to the drawings.

In general, according to one embodiment, an electronic apparatus controls an operation of a control target device. The device includes a first generator, a delayer, a first wireless communicator, a second wireless communicator and a second generator. The first generator is configured to generate a first timing signal. The delayer is configured to delay the first timing signal by a first time and generate a second timing signal for defining a transmission timing of control data related to control of the operation of the control target device. The first wireless communicator is configured to transmit a data signal including the control data based on the second timing signal. The second wireless communicator is configured to receive the data signal and generate a third timing signal for a notification of reception of the data signal. The second generator is configured to generate a fourth timing signal indicating a control timing of the control target device based on the control data, based on the third timing signal.

The disclosure is merely an example, and those skilled in the art can easily conceive appropriate changes while maintaining the gist of the invention, which are naturally included in the scope of the present invention. The drawings may be schematically represented as compared with the embodiments in order to clarify the description, but the drawings are merely examples and do not limit the interpretation of the present invention. Further, in the present specification and the drawings, components exhibiting the same or similar functions as those described above in the above-described drawings may be designated by the same reference signs, and repetitive detailed description may be omitted.

FIG. 1 is a schematic block diagram illustrating a configuration example of an electronic apparatus according to an embodiment. As illustrated in FIG. 1, an electronic apparatus 1 includes a wireless transmitter 11 connected to a sensing device 2 and a wireless receiver 12 connected to a control target device 3. The electronic apparatus 1 controls the operation of the control target device 3. The wireless transmitter 11 acquires sensing data of the sensing device 2, processes the acquired sensing data to generate control data related to control of the operation of the control target device 3, and transmits the generated control data to the wireless receiver 12. The wireless receiver 12 receives the control data transmitted from the wireless transmitter 11 and controls the operation of the control target device 3 based on the received control data. The wireless transmitter 11 may be referred to as a master or a first wireless device, and the wireless receiver 12 may be referred to as a slave or a second wireless device. The control data is data transmitted from the wireless transmitter 11 to the wireless receiver 12. Thus, the control data may be referred to as transmission data or a transmission packet. The control data is, for example, data that is used for defining the operation of the control target device 3 or indicates a target value for the operation of the control target device 3.

Firstly, the wireless transmitter 11 will be described below.

As illustrated in FIG. 1, the wireless transmitter 11 includes a first pulse generator 111 (a first generator), a first data processor 112, a first data register 113, a first pulse delay unit 114 (a delayer), a first controller 115, a first wireless module 116 (a first wireless communicator), and a second data register 117. The first wireless module 116 includes, for example, the second data register 117.

In the embodiment, the first pulse generator 111, the first data register 113, the first pulse delay unit 114, the first controller 115, the first wireless module 116, and the second data register 117 (that is, units that are surrounded by a one-dot chain line and are illustrated in FIG. 1) are configured by, for example, hardware such as field programmable gate arrays (FPGA) and are configured not to be influenced by various interrupt processes. The first pulse generator 111, the first data register 113, the first pulse delay unit 114, the first controller 115, the first wireless module 116, and the second data register 117 may have, for example, a configuration of a combination of hardware and software so long as such units are configured not to be influenced by the various interrupt processes. In the embodiment, units that are surrounded by a one-dot chain line and are illustrated in FIG. 1 are configured not to be influenced by the various interrupt processes, but it is not limited thereto, the first data register 113, the first controller 115 and the first wireless module 116 may be configured not to be influenced by the various interrupt processes and the first pulse generator 111 and the first pulse delay unit 114 may be included in the first data processor 112.

The first pulse generator 111 generates a cycle start signal that is a timing signal generated at regular intervals, and indicates, for example, a start timing of a control cycle (system cycle) related to the control of the operation of the control target device 3. That is, the first pulse generator 111 generates the cycle start signal for each control cycle. The generated cycle start signal is transmitted to the first data processor 112 and the first pulse delay unit 114. The cycle start signal may be referred to as a first timing signal or a master pulse signal. The control cycle is measured, for example, using an internal counter (not illustrated) in the first pulse generator 111, or an external counter (not illustrated) connected to the first pulse generator 111.

The first data processor 112 corresponds to the CPU of the wireless transmitter 11. When the first data processor 112 receives the cycle start signal output from the first pulse generator 111, the first data processor acquires sensing data from the sensing device 2 and processes the acquired sensing data to generate control data. The generated control data is stored in the first data register 113.

When the first pulse delay unit 114 receives the cycle start signal output from the first pulse generator 111, the first pulse delay unit generates a transmission start signal after a first time has elapsed from reception of the cycle start signal. The transmission start signal is used for defining a timing for transmitting the control data to the wireless receiver 12. In other words, the first pulse delay unit 114 determines a timing obtained by adding the first time (being a predetermined delay time) to a timing at which the first pulse delay unit receives the cycle start signal, as the timing for defining a start of transmitting the control data. Then, the first pulse delay unit generates the above-described transmission start signal. Further in other words, the first pulse delay unit 114 delays the cycle start signal by the first time, and generates the transmission start signal for defining the timing for transmitting the control data to the wireless receiver 12. The generated transmission start signal is transmitted to the first wireless module 116. The transmission start signal may be referred to as a second timing signal. Here, in the embodiment, it is not necessary to be strict to be constant. For example, it is assumed that fluctuations to the extent that the operation of the electronic apparatus 1 is not affected are allowed.

When the first pulse delay unit 114 receives the cycle start signal output from the first pulse generator 111, the first pulse delay unit generates a transfer trigger signal for transferring the control data stored in the first data register 113 to the first wireless module 116 after a second time has elapsed from reception of the cycle start signal. In other words, the first pulse delay unit 114 determines a timing obtained by adding the second time (being a predetermined delay time) to a timing at which the first pulse delay unit receives the cycle start signal, as the timing for starting transfer of the control data to the first wireless module 116. Then, the first pulse delay unit generates the above-described transfer trigger signal. The generated transfer trigger signal is transmitted to the first controller 115. It is desirable that the above-described second time be set to a value smaller than the above-described first time.

When the first controller 115 receives the transfer trigger signal output from the first pulse delay unit 114, the first controller acquires the control data stored in the first data register 113 and starts the transfer of the control data to the first wireless module 116, in accordance with the transfer trigger signal. The control data transferred to the first wireless module 116 is stored in the second data register 117.

In the embodiment, it is assumed that the sensing data of the sensing device 2 is used in each control cycle. Thus, the first data processor 112 generates the control data in response to the cycle start signal from the first pulse generator 111, and stores the generated control data in the first data register 113. However, when the sensing data of the sensing device 2 is not used in each control cycle, the first data processor 112 may not execute the above-described various processes in response to the cycle start signal from the first pulse generation unit 111.

When the above-described various processes are not executed in response to the reception of the cycle start signal, for example, the first data processor 112 may generate control data as necessary and store the control data in the first data register 113. Alternatively, when the first controller 115 has a function of notifying the first data processor 112 of the input of the transfer trigger signal from the first pulse delay unit 114, and the first data processor 112 receives the notification from the first controller 115, the first data processor may acquire the sensing data of the sensing device 2 to generate control data and store the generated control data in the first data register 113.

When the first wireless module 116 receives the transmission start signal output from the first pulse delay unit 114, the first wireless module acquires the control data stored in the second data register 117. Then, after a predetermined time has elapsed from a timing at which the transmission start signal is received, the first wireless module starts transmission of a signal including control data to the wireless receiver 12. The signal including control data may be referred to as a data signal. The first wireless module 116 may have an input/output pin for switching from Low to High based on the input of the transmission start signal. In this case, when the input/output pin is switched to High, the first wireless module 116 starts transmission of the signal including the control data to the wireless receiver 12.

Next, the wireless receiver 12 will be described.

As illustrated in FIG. 1, the wireless receiver 12 includes a second wireless module 121 (a second wireless communicator), a third data register 122, a second data processor 123, a fourth data register 124, a second pulse generator 125 (a second generator), a second pulse delay unit 126, and a second controller 127. The second wireless module 121 includes, for example, the third data register 122. The second pulse generator 125 includes, for example, the second pulse delay unit 126.

In the embodiment, the second wireless module 121, the third data register 122, the fourth data register 124, the second pulse generator 125, the second pulse delay unit 126, and the second controller 127 (that is, units that are surrounded by a one-dot chain line and are illustrated in FIG. 1) are configured by, for example, hardware such as FPGAs and are configured not to be influenced by various interrupt processes. The second wireless module 121, the third data register 122, the fourth data register 124, the second pulse generator 125, the second pulse delay unit 126, and the second controller 127 may have, for example, a configuration of a combination of hardware and software so long as such units are configured not to be influenced by the various interrupt processes. In the embodiment, units that are surrounded by a one-dot chain line and are illustrated in FIG. 1 are configured not to be influenced by the various interrupt processes, but it is not limited thereto, the second wireless module 121, the third data register 122, the fourth data register 124 and the second controller 127 may be configured not to be influenced by the various interrupt processes and the second pulse generator 125 and the second pulse delay unit 126 may be included in the second data processor 123.

The second wireless module 121 receives a signal that includes control data and is transmitted from the wireless transmitter 11. The control data included in the received signal is stored in the third data register 122 and transmitted to the second data processor 123.

The second data processor 123 corresponds to the CPU of the wireless receiver 12. When the second data processor 123 receives the control data output from the second wireless module 121, the second data processor processes the control data in order to transmit the control data to the control target device 3, and then stores the control data in the fourth data register 124.

The second wireless module 121 receives the signal that includes the control data and is transmitted from the wireless transmitter 11, and generates a reception notification signal for a notification of the reception of the signal including the control data. Specifically, the second wireless module 121 determines a timing at which the preamble of the control data is received, as a timing for a notification that the reception of the signal including the control data has started. Then, the second wireless module generates the above-described reception notification signal. The generated reception notification signal is transmitted to the second pulse generator 125. The reception notification signal may be referred to as a third timing signal.

In the embodiment, a case where the reception notification signal is generated at the timing when the preamble of the control data is received is described, but the embodiment is not limited to this. For example, the reception notification signal may be generated at a timing at which reception of the control data included in the received signal is started or at a timing at which the reception of the control data included in the received signal is completed.

When the second pulse generator 125 receives the reception notification signal output from the second wireless module 121, the second pulse generator generates a control instruction signal for an instruction of a timing for controlling the operation of the control target device 3 based on the control data. The generated control instruction signal is transmitted to the second controller 127. The control instruction signal may be referred to as a fourth timing signal.

The second pulse generator 125 includes a first counter (not illustrated) and a second counter (not illustrated). The count value of the first counter is reset when the reception notification signal is input or the control instruction signal is output. The count value of the second counter is reset when the control instruction signal is output. Although the details will be described later, the first counter is mainly used for counting the time after the reception notification signal is received, and the second counter is mainly used for counting the elapsed time in the control cycle related to the control of the operation of the control target device 3. Data indicating the timing at which the first counter and the second counter are reset may be appropriately stored in, for example, the internal memory of the second controller 127. The second counter may be configured to continuously count the count value over a plurality of control cycles without resetting the count value.

When the second controller 127 receives the control instruction signal output from the second pulse generator 125, the second controller acquires the control data stored in the fourth data register 124, and controls the operation of the control target device 3 based on the control data. Specifically, the second controller 127 performs control to drive the control target device 3 with a voltage, a current, the number of rotations, and the like determined based on the control data. Alternatively, the second controller 127 performs control of instructing the control target device 3 to operate at the voltage, the current, the number of rotations, and the like determined based on the control data.

Here, with reference to FIG. 2, the timing at which the first wireless module 116 in the wireless transmitter 11 starts transmission of the signal including the control data to the wireless receiver 12 will be described in detail.

FIG. 2A illustrates a case where the transfer trigger signal is transmitted from the first pulse delay unit 114 to the first controller 115 at a timing t1 before the transmission start signal, and the transfer of the control data is already completed at a timing t2 at which the transmission start signal is transmitted from the first pulse delay unit 114 to the first wireless module 116.

In this case, when the first wireless module 116 receives the transmission start signal at the timing t2, the first wireless module starts transmission of the signal including the control data to the wireless receiver 12 from a timing t3 at which a predetermined time has elapsed from the timing t2. The predetermined time from the timing t2 to the timing t3 (that is, the time from when the transmission start signal is received until the transmission of the signal including the control data is actually started) is a delay time caused by the hardware and can be considered as being almost constant.

As described above, when the transmission start signal is input in a state where the transfer of the control data is completed, the wireless transmitter 11 does not need to perform the transfer of the control data to the first wireless module 116 and transmission of the control data to the wireless receiver 12 in parallel. Thus, it is possible to substantially uniquely determine the timing at which the transmission of the signal including the control data is started, and the most desirable form for transmitting the signal including the control data is obtained.

The first wireless module 116 according to the embodiment can start transmission of the signal including the control data to the wireless receiver 12 even in the cases illustrated in FIGS. 2B to 2D.

FIG. 2B illustrates a case where the transfer trigger signal is transmitted from the first pulse delay unit 114 to the first controller 115 at a timing t1 before the transmission start signal, and the transmission start signal is transmitted from the first pulse delay unit 114 to the first wireless module 116 at the timing t4 in the middle of transferring the control data.

In this case, the first wireless module 116 can start transmission of the control data to the wireless receiver 12 in order from a portion of the control data of which the transfer is completed at the timing t4 at which the transmission start signal is received. The transfer of control data, of which the transfer is not completed at the timing t4 at which the transmission start signal is received is also continuously performed in parallel with the transmission of a signal including a portion of the control data to the wireless receiver 12.

In the case of FIG. 2B, the transfer of the control data to the first wireless module 116 and the transmission of the control data to the wireless receiver 12 are performed in parallel. Thus, a timing at which the first wireless module 116 starts transmission of the signal including a portion of the control data to the wireless receiver 12 depends on the processing capability of the wireless transmitter 11. Thus, the transmission of the signal including a portion of the control data is started from any time point in a period indicated by a double-sided arrow in FIG. 2B, for example.

FIG. 2C illustrates a case where the transfer trigger signal and the transmission start signal are simultaneously transmitted from the first pulse delay unit 114 at the timing t1. FIG. 2D illustrates a case where the transmission start signal is transmitted from the first pulse delay unit 114 to the first wireless module 116 at a timing t5 before the transfer trigger signal, and the transfer start signal is transmitted from the first pulse delay unit 114 to the first controller 115 at the timing t1. In short, FIGS. 2C and 2D illustrate a case where the transfer of the control data to the first wireless module 116 is not started at a time point when the transmission start signal is input.

In the cases, transfer of the control data to the first wireless module 116 and the transmission of the control data to the wireless receiver 12 are performed in parallel. Thus, a timing at which the first wireless module 116 starts transmission of the signal including a portion of the control data, which is sequentially transferred from the first controller 115 depends on the processing capability of the wireless transmitter 11. Thus, the transmission of the signal including a portion of the control data is started from any time point in a period indicated by double-sided arrows in FIGS. 2C and 2D, for example. Here, in the cases of FIGS. 2B to 2D, a period from an input of the transmission start signal to the start of transmission of the signal including a portion of the control data is longer than, for example, the delay time due to hardware in the case of FIG. 2A, in order to transfer the control data. The timing at which the transmission of the signal including a portion of the control data is started within the period indicated by the double-sided arrow has, for example, a normal distribution pattern in this period.

In the cases of FIGS. 2C and 2D, it is desirable to make setting in which the transmission of the signal including the control data to the wireless receiver 12 is not started unless both the transfer trigger signal and the transmission start signal are input in the same control cycle.

As described above, the first wireless module 116 according to the embodiment can transmit the signal including the control data to the wireless receiver 12 even when the transfer of the control data is not completed at the time point at which the transmission start signal is received. However, in the cases of FIGS. 2B to 2D, as described above, variations depending on the processing capability of the wireless transmitter 11 occurs during a time from the reception of the transmission start signal to the start of the transmission of the signal including the control data. Thus, the accuracy of the control instruction signal may be slightly deteriorated (that is, timings for generating and outputting the control instruction signal may vary for each control cycle). Therefore, it is desirable that the signal including the control data be transmitted in the form illustrated in FIG. 2A as much as possible.

In the embodiment, it is desirable that the wireless transmitter 11 be a radio device having a standard that does not require carrier sensing when transmitting data to the wireless receiver 12. According to this, it is possible to suppress the above-described deterioration of the accuracy, which is caused by the random waiting time for the carrier sensing.

Next, some methods in which the second pulse generator 125 generates and outputs the control instruction signal based on the reception notification signal from the second wireless module 121 will be described in order.

First Generation Method

Firstly, a first generation method will be described.

The first generation method is a method of generating and outputting a control instruction signal after a predetermined time from reception of a reception notification signal.

In the embodiment, as described above, the first pulse generator 111, the first data register 113, the first pulse delay unit 114, the first controller 115, the first wireless module 116, and the second data register 117 in the wireless transmitter 11, and the second wireless module 121, the third data register 122, the fourth data register 124, the second pulse generator 125, the second pulse delay unit 126, and the second controller 127 in the wireless receiver 12 are configured by, for example, hardware and are configured not to be influenced by various interrupt processes. According to such a configuration, it is possible to suppress an occurrence of a situation in which a time (described as a third time below) taken from when the first pulse generator 111 in the wireless transmitter 11 outputs a cycle start signal until the second pulse generator 125 in the wireless receiver 12 receives a reception notification signal varies for each control cycle. Therefore, the second pulse generator 125 can consider the above-described third time to be a constant value that does not change for each control cycle. The second pulse delay unit 126 in the second pulse generator 125 substracts the constant value from the time taken for one control cycle, and thereby can uniquely determine the delay time (described as a fourth time below) taken from reception of the reception notification signal to an output of the control instruction signal.

As described above, in the first generation method, the second pulse generator 125 generates and outputs the control instruction signal when the above-described fourth time has elapsed after the reception notification signal is received. More specifically, the second pulse generator 125 generates and outputs the control instruction signal by the elapse of the fourth time set based on the control cycle and the third time, after the reception notification signal is received.

The third time can be approximated to the time required from the output of the control instruction signal in the previous control cycle to the input of the reception notification signal in the current control cycle. The current control cycle may be referred to as a first control cycle. The count value of the second counter (and the first counter reset with the output of the control instruction signal) corresponds to the approximated time. The fourth time is approximated by a value obtained by subtracting the count value corresponding to the above-described third time from the count value Ct corresponding to one control cycle.

In the wireless communication performed between the wireless transmitter 11 and the wireless receiver 12, transmission data may be lost (transmission packet may be lost) by a communication error, or a communication delay may occur. Therefore, in the first generation method, when the time corresponding to the one control cycle has elapsed while it is not possible for the second pulse generator 125 to receive the reception notification signal, the second pulse generator recognizes that a signal including control data is lost or a communication delay occurs, and exceptionally generates and outputs the control instruction signal.

Here, a first generation process executed by the second pulse generator 125 will be described with reference to the flowchart in FIG. 3. The series of first generation processes illustrated in FIG. 3 is executed for each clock input to the first counter and the second counter. Here, it is assumed that the clock frequencies of the clocks input to the first counter and the second counter are constant.

Firstly, the second pulse generator 125 determines whether or not the reception notification signal from the second wireless module 121 is input (Step S1). If the second pulse generator 125 determines that the reception notification signal is not input as a result of the process of Step S1 (No in Step S1), the second pulse generator 125 determines whether or not the count value of the second counter reaches the count value Ct corresponding to one control cycle (Step S2).

If the second pulse generator 125 determines that the count value of the second counter does not reach the count value Ct corresponding to one control cycle as a result of the process of Step S2 (No in Step S2), the second pulse generator 125 adds 1 to the count values of the first counter and the second counter (Step S3), and then executes the above-described process of Step S1 again. If the second pulse generator 125 determines that the count value of the second counter reaches the count value Ct corresponding to one control cycle as a result of the process of Step S2 (Yes in Step S2), the second pulse generator executes the process of Step S6 described later.

If the second pulse generator 125 determines that the reception notification signal is input as a result of the above-described process of Step S1 (Yes in Step S1), the second pulse generator 125 resets the count value of the first counter, and then determines whether or not the count value of the first counter after the reset (that is, the count value after the reception notification signal is received) reaches a fixed value Cn corresponding to the fourth time (Step S4). If the second pulse generator 125 determines that the count value of the first counter after the reset does not reach the fixed value Cn as a result of the process of Step S4 (No in Step S4), the second pulse generator 125 adds 1 to the count values of the first counter and the second counter (Step S5), and then executes the process of Step S4 again.

If the second pulse generator 125 determines that the count value of the first counter after the reset reaches the fixed value Cn as a result of the process of Step S4 (Yes in Step S4), the second pulse generator 125 generates the control instruction signal and outputs the control instruction signal to the second controller 127. Then, the second pulse generator 125 resets the count values of the first counter and the second counter (Step S6), and executes the series of first generation processes again in accordance with the next clocks that are input to the first counter and the second counter.

Second Generation Method

Next, a second generation method will be described.

The second generation method is different from the above-described first generation method in that the fourth time taken from reception of the reception notification signal to the output of the control instruction signal is made variable instead of a fixed value. Specifically, the second generation method is different from the above-described first generation method in that the average of a plurality of third times in the previous control cycles (that is, the control cycles up to the previous control cycle) is calculated, and a value calculated in a manner of subtracting the average from the time taken for one control cycle is set as the fourth time in the current control cycle. The average of the third time is calculated by a method such as an arithmetic average, a weighted average, or a weighted moving average. In this case, the second pulse generator 125 generates and outputs the control instruction signal by the elapse of the fourth time set based on the calculated average of the third time, after the reception notification signal is received in the current control cycle. The average of the third time may be referred to as the average time.

Figure 4:
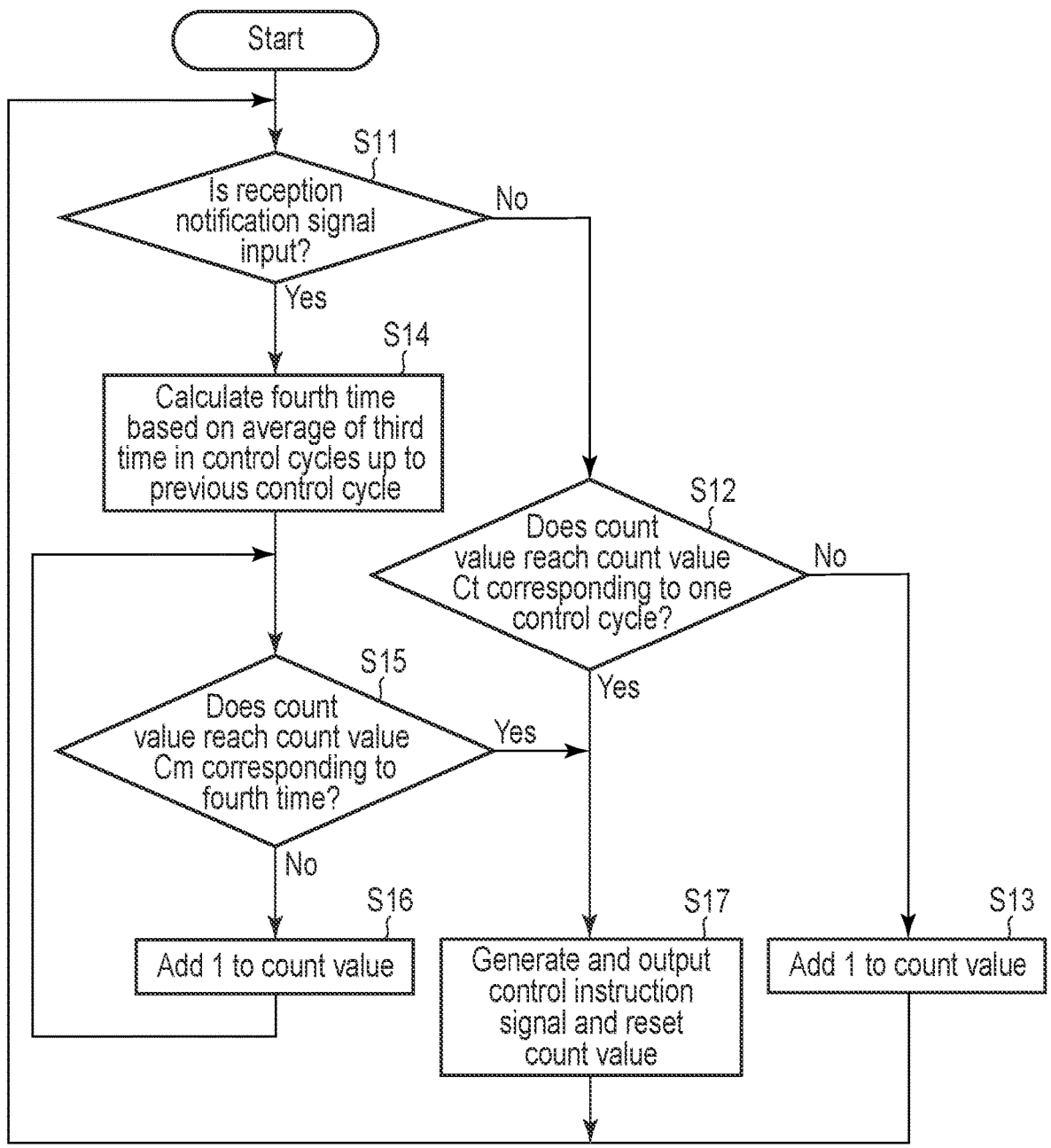
FIG. 4 is a flowchart illustrating an example of a procedure of a second pulse generation process executed by the wireless receiver according to the embodiment.

Here, a second generation process executed by the second pulse generator 125 will be described with reference to the flowchart in FIG. 4. The series of second generation processes illustrated in FIG. 4 is executed for each clock input to the first counter and the second counter. Here, it is assumed that the clock frequencies of the clocks input to the first counter and the second counter are constant.

Firstly, the second pulse generator 125 determines whether or not the reception notification signal from the second wireless module 121 is input (Step S11). If the second pulse generator 125 determines that the reception notification signal is not input as a result of the process of Step S11 (No in Step S11), the second pulse generator 125 determines whether or not the count value of the second counter reaches the count value Ct corresponding to one control cycle (Step S12).

If the second pulse generator 125 determines that the count value of the second counter does not reach the count value Ct corresponding to one control cycle as a result of the process of Step S12 (No in Step S12), the second pulse generator 125 adds 1 to the count values of the first counter and the second counter (Step S13), and then executes the above-described process of Step S11 again. If the second pulse generator 125 determines that the count value of the second counter reaches the count value Ct corresponding to one control cycle as a result of the process of Step S12 (Yes in Step S12), the second pulse generator 125 executes the process of Step S17 described later.

If the second pulse generator 125 determines that the reception notification signal is input as a result of the above-described process of Step S11 (Yes in Step S11), the second pulse generator 125 resets the count value of the first counter, and then calculates the average of the third time in the control cycles up to the previous control cycle. Then, the second pulse generator 125 calculates the fourth time (count value Cm corresponding to the fourth time) by subtracting the average of the third time from the time taken for one control cycle (Step S14).

Then, the second pulse generator 125 determines whether or not the count value of the first counter after the reset (that is, the count value after the reception notification signal is received) reaches the count value Cm (Step S15). If the second pulse generator 125 determines that the count value of the first counter after the reset does not reach the count value Cm as a result of the process of Step S15 (No in Step S15), the second pulse generator 125 adds 1 to the count values of the first counter and the second counter (Step S16), and then executes the process of Step S15 again.

If the second pulse generator 125 determines that the count value of the first counter after the reset reaches the count value Cm as a result of the process of Step S15 (Yes in Step S15), the second pulse generator 125 generates the control instruction signal and outputs the control instruction signal to the second controller 127. Then, the second pulse generator 125 resets the count values of the first counter and the second counter (Step S17), and executes the series of second generation processes again in accordance with the next clocks that are input to the first counter and the second counter.

As represented by the processes of Steps S11 to S13 in FIG. 4, even in the second generation method, when the time corresponding to the one control cycle has elapsed while it is not possible for the second pulse generator 125 to receive the reception notification signal, the second pulse generator can recognize that a signal including control data is lost or a communication delay occurs, and exceptionally generate and output the control instruction signal. That is, it is possible to handle the loss of the signal including control data and the communication delay.

Third Generation Method

Next, a third generation method will be described.

In the third generation method, the second pulse generator 125 calculates the average of a plurality of third times in the control cycles up to the previous control cycle, and corrects the count value of the second counter, that corresponds to the third time in the current control cycle by using a difference between the third time in the current control cycle and the average. When the corrected count value reaches the count value Ct corresponding to one control cycle, the second pulse generator 125 generates and outputs the control instruction signal. The above-described average of the third time is calculated by a method such as an arithmetic average, a weighted average, or a weighted moving average. The third generation method is realized by a phase-locked loop (PLL) using the first counter and the second counter. The PLL may be realized by either an analog circuit or a digital circuit.

Figure 5:
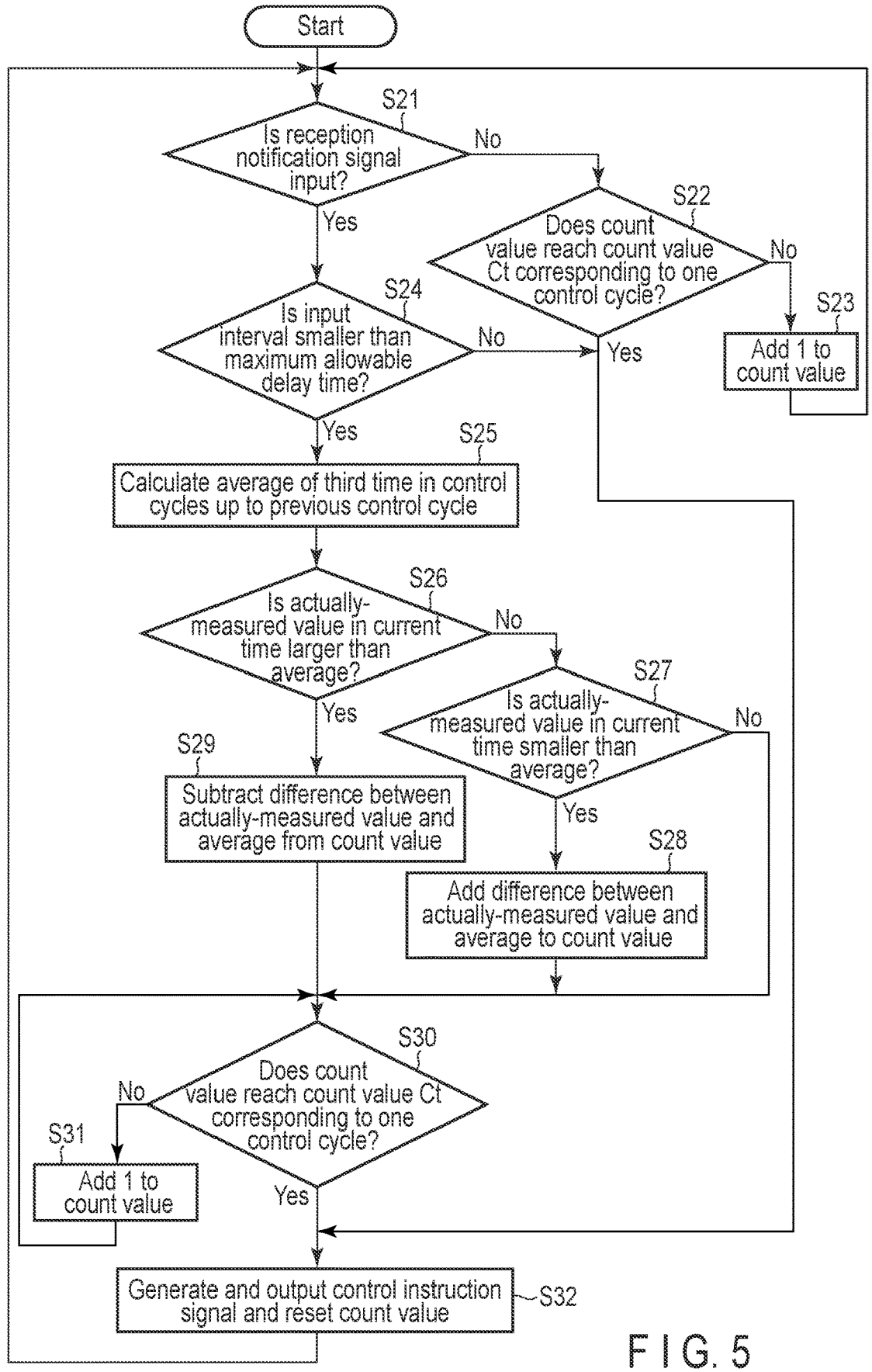
FIG. 5 is a flowchart illustrating an example of a procedure of a third pulse generation process executed by the wireless receiver according to the embodiment.

Here, a third generation process executed by the second pulse generator 125 will be described with reference to the flowchart in FIG. 5. The series of third generation processes illustrated in FIG. 5 is executed for each clock input to the first counter and the second counter. Here, it is assumed that the clock frequencies of the clocks input to the first counter and the second counter are constant.

Firstly, the second pulse generator 125 determines whether or not the reception notification signal from the second wireless module 121 is input (Step S21). If the second pulse generator 125 determines that the reception notification signal is not input as a result of the process of Step S21 (No in Step S21), the second pulse generator 125 determines whether or not the count value of the second counter reaches the count value Ct corresponding to one control cycle (Step S22).

If the second pulse generator 125 determines that the count value of the second counter does not reach the count value Ct corresponding to one control cycle as a result of the process of Step S22 (No in Step S22), the second pulse generator 125 adds 1 to the count values of the first counter and the second counter (Step S23), and then executes the above-described process of Step S21 again. If the second pulse generator 125 determines that the count value of the second counter reaches the count value Ct corresponding to one control cycle as a result of the process of Step S22 (Yes in Step S22), the second pulse generator 125 executes the process of Step S32 described later. If the second pulse generator 125 determines that the reception notification signal is input as a result of the above-described process of Step S21 (Yes in Step S21), the second pulse generator 125 determines whether or not an interval (described as an input interval below) from when the previous reception notification signal is received until the current reception notification signal is received is smaller than the maximum allowable delay time (Step S24). The maximum allowable delay time is a value set in advance for recognizing that transmission data is lost or the communication delay occurs. If the above-described input interval is equal to or larger than the maximum allowable delay time, the second pulse generator 125 recognizes that transmission data is lost or the communication delay occurs.

If the second pulse generator 125 determines that the input interval is equal to or larger than the maximum allowable delay time as a result of the process of Step S24 (No in Step S24), the second pulse generator 125 executes the process of Step S32 described later.

If the second pulse generator 125 determines that the input interval is smaller than the maximum allowable delay time as a result of the process of Step S24 (Yes in Step S24), the second pulse generator 125 resets the count value of the first counter, and then calculates the average of the third time in the control cycles up to the previous control cycle (Step S25). The second pulse generator 125 compares the calculated average of the third time (count value corresponding to the third time) with the count value of the second counter, and determines whether or not the actually-measured value in the current time (that is, count value of the second counter) is larger than the average (Step S26).

If the second pulse generator 125 determines that the actually-measured value in the current time is equal to or smaller than the average as a result of the process of Step S26 (No in Step S26), the second pulse generator 125 compares the calculated average of the third time (count value corresponding to the third time) with the count value of the second counter again, and determines whether or not the actually-measured value in the current time is smaller than the average (Step S27). If the second pulse generator 125 determines that the actually-measured value in the current time is equal to or larger than the average, that is, the actually-measured value in the current time is equal to the above-described average as a result of the process of Step S27 (No in Step S27), the second pulse generator 125 determines that it is not necessary to correct the count value of the second counter, and then executes the process of Step S30 described later.

If the second pulse generator 125 determines that the actually-measured value in the current time is smaller than the above-described average as a result of the process of Step S27 (Yes in Step S27), the second pulse generator 125 adds a difference (count value corresponding to the difference) between the actually-measured value in the current time and the above-described average, to the count value of the second counter (Step S28). Then, the second pulse generator executes the process of Step S30 described later.

If the second pulse generator 125 determines that the actually-measured value in the current time is larger than the above-described average as a result of the above-described process of Step S26 (Yes in Step S26), the second pulse generator 125 corrects the count value of the second counter by subtracting a difference (count value corresponding to the difference) between the actually-measured value in the current time and the above-described average, from the count value of the second counter (Step S29).

Then, the second pulse generator 125 determines whether or not the corrected count value of the second counter reaches the count value Ct corresponding to one control cycle (Step S30). If the second pulse generator 125 determines that the count value of the second counter does not reach the count value Ct corresponding to one control cycle as a result of the process of Step S30 (No in Step S30), the second pulse generator 125 adds 1 to the count values of the first counter and the second counter (Step S31), and then executes the process of Step S30 again.

If the second pulse generator 125 determines that the count value of the second counter reaches the count value Ct corresponding to one control cycle (Yes in Step S30), the second pulse generator generates the control instruction signal and outputs the control instruction signal to the second controller 127. Then, the second pulse generator 125 resets the count values of the first counter and the second counter (Step S32), and executes the series of third generation processes again in accordance with the next clocks that are input to the first counter and the second counter.

As represented by the processes of Steps S21 to S24 in FIG. 5, even in the third generation method, when the time corresponding to the one control cycle has elapsed while it is not possible for the second pulse generator 125 to receive the reception notification signal, or when the above-described input interval is equal to or larger than the maximum allowable delay time, the second pulse generator 125 can recognize that a signal including control data is lost or a communication delay occurs, and exceptionally generate and output the control instruction signal. That is, it is possible to handle the loss of the signal including control data and the communication delay.

Fourth Generation Method

Further, a fourth generation method will be described.

The fourth generation method is different from the above-described third generation method in that the error of the count value of the second counter is not corrected, but the error of the count value of the second counter is handled by changing the clock frequency of the clock input to the second counter. Specifically, in the fourth generation method, the second pulse generator 125 calculates the average of a plurality of third times in the control cycles up to the previous control cycle, and the clock frequency of the clock input to the second counter is changed based on the difference between the third time in the current control cycle and the average. The second pulse generator 125 generates and outputs the control instruction signal when the count value of the second counter in response to the input of the clock having the changed clock frequency reaches the count value Ct corresponding to one control cycle. The above-described average of the third time is calculated by a method such as an arithmetic average, a weighted average, or a weighted moving average. The fourth generation method is realized by a PLL using the first counter and the second counter. The PLL may be realized by either an analog circuit or a digital circuit.

Figure 6:
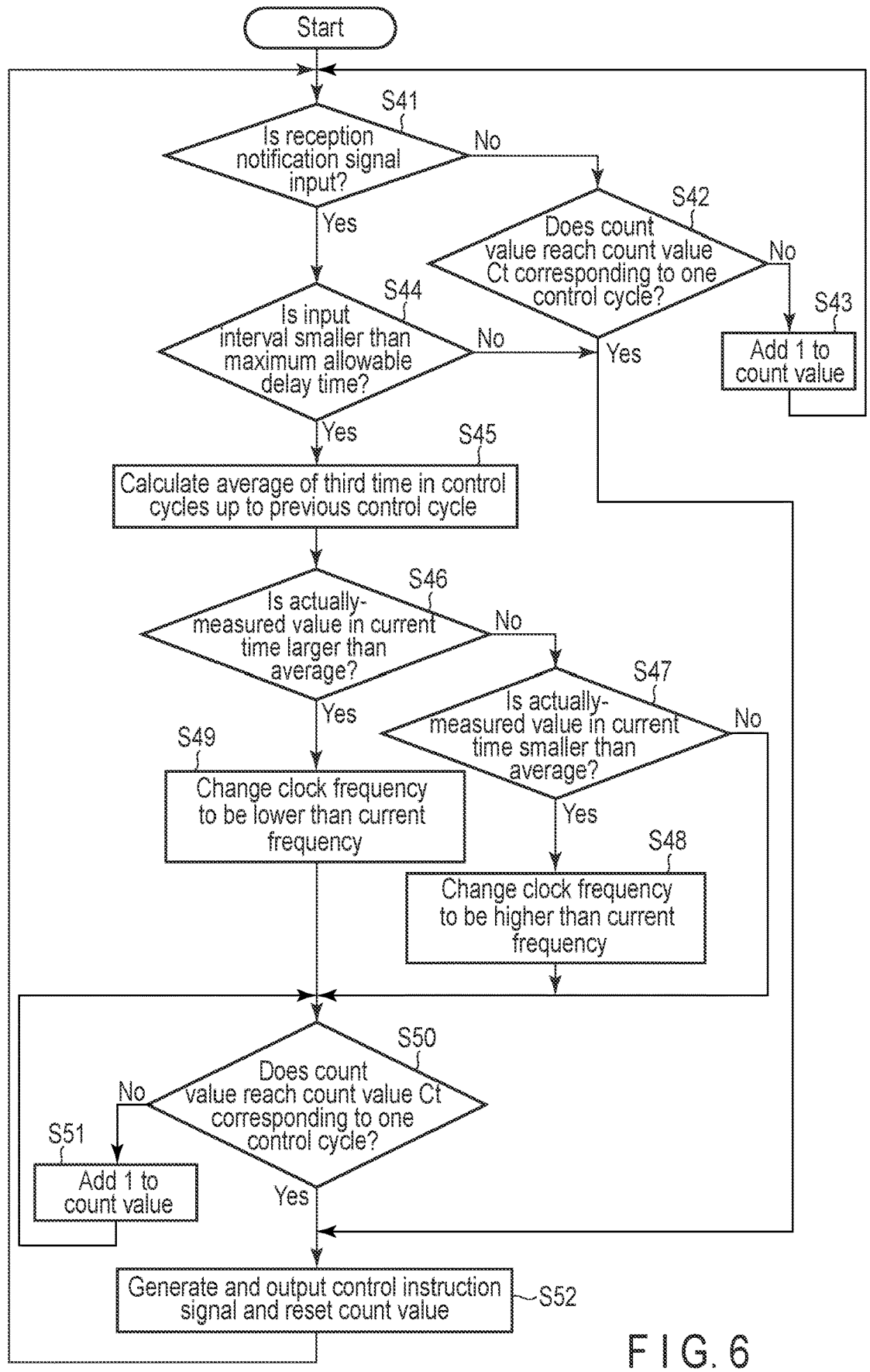
FIG. 6 is a flowchart illustrating an example of a procedure of a fourth pulse generation process executed by the wireless receiver according to the embodiment.

Here, a fourth generation process executed by the second pulse generator 125 will be described with reference to the flowchart in FIG. 6. The series of fourth generation processes illustrated in FIG. 6 is executed for each clock input to the first counter and the second counter. In the fourth generation process, it is assumed that the clock frequencies of the clocks input to the first counter and the second counter are variable.

Firstly, the second pulse generator 125 determines whether or not the reception notification signal from the second wireless module 121 is input (Step S41). If the second pulse generator 125 determines that the reception notification signal is not input as a result of the process of Step S41 (No in Step S41), the second pulse generator 125 determines whether or not the count value of the second counter reaches the count value Ct corresponding to one control cycle (Step S42).

If the second pulse generator 125 determines that the count value of the second counter does not reach the count value Ct corresponding to one control cycle as a result of the process of Step S42 (No in Step S42), the second pulse generator 125 adds 1 to the count values of the first counter and the second counter (Step S43), and then executes the above-described process of Step S41 again. If the second pulse generator 125 determines that the count value of the second counter reaches the count value Ct corresponding to one control cycle as a result of the process of Step S42 (Yes in Step S42), the second pulse generator 125 executes the process of Step S52 described later.

If the second pulse generator 125 determines that the reception notification signal is input as a result of the above-described process of Step S41 (Yes in Step S41), the second pulse generator 125 determines whether or not the input interval from when the previous reception notification signal is received until the current reception notification signal is received is smaller than the maximum allowable delay time (Step S44).

If the second pulse generator 125 determines that the input interval is equal to or larger than the maximum allowable delay time as a result of the process of Step S44 (No in Step S44), the second pulse generator 125 executes the process of Step S52 described later.

If the second pulse generator 125 determines that the input interval is smaller than the maximum allowable delay time as a result of the process of Step S44 (Yes in Step S44), the second pulse generator 125 resets the count value of the first counter, and then calculates the average of the third time in the control cycles up to the previous control cycle (Step S45). The second pulse generator 125 compares the calculated average of the third time (count value corresponding to the third time) with the count value of the second counter, and determines whether or not the actually-measured value in the current time (that is, count value of the second counter) is larger than the average (Step S46).

If the second pulse generator 125 determines that the actually-measured value in the current time is equal to or smaller than the average as a result of the process of Step S46 (No in Step S46), the second pulse generator 125 compares the calculated average of the third time (count value corresponding to the third time) with the count value of the second counter again, and determines whether or not the actually-measured value in the current time is smaller than the average (Step S47). If the second pulse generator 125 determines that the actually-measured value in the current time is equal to or larger than the above-described average, that is, the actually-measured value in the current time is equal to the above-described average as a result of the process of Step S47 (No in Step S47), the second pulse generator 125 determines that it is not necessary to change the clock frequency of the clock input to the second counter (and first counter), and then executes the process of Step S50 described later.

If the second pulse generator 125 determines that the actually-measured value in the current time is smaller than the above-described average as a result of the process of Step S47 (Yes in Step S47), the second pulse generator 125 changes the clock frequency of the clock input to the second counter (and first counter) to increase (the second generator 125 changes the clock frequency of the clock input to the second counter (and first counter) to be higher than current frequency) (Step S48), and then executes the process of Step S50 described later.

If the second pulse generator 125 determines that the actually-measured value in the current time is larger than the above-described average as a result of the above-described process of Step S46 (Yes in Step S46), the second pulse generator 125 changes the clock frequency of the clock input to the second counter (and first counter) to decrease (the second generator 125 changes the clock frequency of the clock input to the second counter (and first counter) to be lower than current frequency) (Step S49).

In the processes of Steps S48 and S49 described above, the second pulse generator 125 may change the clock frequency by raising or lowering the clock frequency by a predetermined value. Preferably, the second pulse generator 125 changes the clock frequency by raising or lowering the clock frequency so as to match the remaining count value until the count value reaches the count value Ct corresponding to one control cycle.

Then, the second pulse generator 125 determines whether or not the count value of the second counter reaches the count value Ct corresponding to one control cycle (Step S50). If the second pulse generator 125 determines that the count value of the second counter does not reach the count value Ct corresponding to one control cycle as a result of the process of Step S50 (No in Step S50), the second pulse generator 125 adds 1 to the count values of the first counter and the second counter (Step S51), and then executes the process of Step S50 again.

If the second pulse generator 125 determines that the count value of the second counter reaches the count value Ct corresponding to the one control cycle (Yes in Step S50), the second pulse generator 125 generates the control instruction signal and outputs the control instruction signal to the second controller 127. Then, the second pulse generator 125 resets the count values of the first counter and the second counter (Step S52), and executes the series of fourth generation processes again in accordance with the next clocks that are input to the first counter and the second counter. The clock frequencies of the clocks input to the first counter and the second counter may be brought back into the default values at a timing at which the above-described series of fourth generation processes are completed once, or the next fourth generation process may be executed with the changed values, without being brought back into the default values.

As represented by the processes of Steps S41 to S44 in FIG. 6, even in the fourth generation method, when the time corresponding to the one control cycle has elapsed while it is not possible for the second pulse generator 125 to receive the reception notification signal, or when the above-described input interval is equal to or larger than the maximum allowable delay time, the second pulse generator 125 can recognize that a signal including control data is lost or a communication delay occurs, and exceptionally generate and output the control instruction signal. That is, it is possible to handle the loss of the signal including control data and the communication delay.

The first to fourth generation processes described above are executed by the second pulse generator 125, and thereby the wireless receiver 12 can perform timing synchronization with the wireless transmitter 11.

In the embodiment, it is assumed that, when the control instruction signal is output, the second controller 127 that receives the control instruction signal controls the control target device 3 without a delay. A timing at which the second controller 127 controls the control target device 3 may be delayed from the timing at which the control instruction signal is received. The delay time in this case (that is, the time from when the second controller 127 receives the control instruction signal until the second controller actually controls the control target device 3) is a delay time caused by the hardware and can be considered as being almost constant. In this case, since the one control cycle includes the above third time, the above fourth time, and the above delay time, the first to fourth generation processes described above can be executed by replacing the count value Ct corresponding to the one control cycle, with a count value Ct' obtained by subtracting the delay time from the count value Ct. Since the count value Ct' is approximate to the count value Ct, the count value Ct' may be referred to as the count value corresponding to one control cycle.

According to the embodiment described above, in the electronic apparatus 1, the first pulse generator 111, the first data register 113, the first pulse delay unit 114, the first controller 115, the first wireless module 116, and the second data register 117 in the wireless transmitter 11, and the second wireless module 121, the third data register 122, the fourth data register 124, the second pulse generator 125, the second pulse delay unit 126, and the second controller 127 in the wireless receiver 12 are configured by hardware and are configured not to be influenced by various interrupt processes. Therefore, in the electronic apparatus 1 according to the embodiment, it is possible to make the third time taken from when the first pulse generator 111 outputs the reception start signal until the second pulse generator 125 receives the reception notification signal, constant. Thus, it is possible to suppress the occurrence of a situation in which the third time varies for each control cycle. That is, it is possible to suppress the occurrence of a situation in which the synchronization accuracy between the wireless transmitter 11 and the wireless receiver 12 varies and is deteriorated for each control cycle.

It is possible to make the third time substantially constant, and thus the second pulse generator 125 can execute the first to fourth generation processes described above. According to this, the wireless receiver 12 can further perform the timing synchronization with the wireless transmitter 11, and it is possible to further suppress deterioration of the synchronization accuracy of the control timing between the wireless transmitter 11 and the wireless receiver 12 in the electronic apparatus 1.

In the embodiment described above, it is assumed that the wireless transmitter 11 transmits the control data used for controlling the operation of the control target device 3 to the wireless receiver 12. The embodiment is not limited to this, the wireless transmitter 11 may transmit null data (null packet) to the wireless receiver 12. In this case, since the transmitted data is not the control data to be used in operation control, it is not possible for the wireless receiver 12 to control the operation of the control target device 3. However, it is possible to execute the first to fourth pulse generation processes described above and to perform the timing synchronization with the wireless transmitter 11, by outputting the reception notification signal in response to the reception of the null data.

Further, in the embodiment described above, the case where the wireless transmitter 11 transmits the signal including control data to one wireless receiver 12 has been described. The embodiment is not limited to this. The wireless transmitter 11 can transmit the signal including the control data to a plurality of wireless receivers 12 and perform the timing synchronization with the wireless receivers 12. In this case, it is desirable that unicast or broadcast is used as the communication method between the wireless transmitter 11 and each of the wireless receivers 12. When unicast is used as the communication method, it is possible to re-transmit the transmission data (that is, re-transmit the signal including the control data) when the transmission data is lost or the communication delay occurs.

When the control timings between the wireless transmitter 11 and the wireless receivers 12 are synchronized, it is possible to realize a cooperative operation using the wireless receivers 12 by a method including: for example, a step of performing predetermined control on a second wireless receiver 12b after X clocks from when predetermined control is performed on a first wireless receiver 12a; and a step of performing predetermined control on a third wireless receiver 12c after Y clocks from when predetermined control is performed on the second wireless receiver 12b.

In addition, in the embodiment described above, the case where the wireless transmitter 11 transmits the signal including the control data to the wireless receiver 12 once in one control cycle has been described. The embodiment is not limited to this. The wireless transmitter 11 may transmit the signal including the control data to the wireless receiver 12 a plurality of times in one control cycle. Transmission of the signal including the control data a plurality of times in one control cycle may be performed for re-transmission due to the loss of the signal including the control data or the occurrence of the communication delay, or may be performed regardless of the loss of the signal including the control data or the occurrence of the communication delay.

When the wireless transmitter 11 transmits the signal including the control data to the wireless receiver 12 a plurality of times in one control cycle, the wireless receiver 12 can perform the timing synchronization with the wireless transmitter 11, for example, by a method as follows.

The second pulse generator 125 in the wireless receiver 12 refers to the count values of the first counter and the second counter to check whether the reception notification signal input in the current time is a reception notification signal corresponding to the signal including the control data, which is transmitted at what number in one control cycle in the current time. Therefore, for example, when the signal including the control data is transmitted three times in one control cycle, and the wireless receiver 12 can receive the signal including the control data transmitted at the second transmission timing, the second pulse generator 125 executes the above-described first to fourth pulse generation processes based on the reception notification signal corresponding to the signal including the control data transmitted at the second transmission timing, and thereby it is possible to perform the timing synchronization with the wireless transmitter 11. In this case, the time taken from the start of this one control cycle to the reception of the reception notification signal corresponding to the signal including the control data transmitted at the second transmission timing is the third time, and the time obtained by subtracting the third time from the time taken for one control cycle is the fourth time. As described above, when the wireless transmitter 11 transmits the signal including the control data to the wireless receiver 12 a plurality of times in one control cycle, the second pulse generator 125 generates the reception notification signal in response to the reception of the signal including the control data received firstly among the signals including the control data, which are transmitted a plurality of times.

The wireless receiver 12 can also perform the timing synchronization with the wireless transmitter 11 that transmits the signal including the control data a plurality of times in one control cycle, by a method as follows. The method will be described below with reference to FIG. 7.

Figure 7:
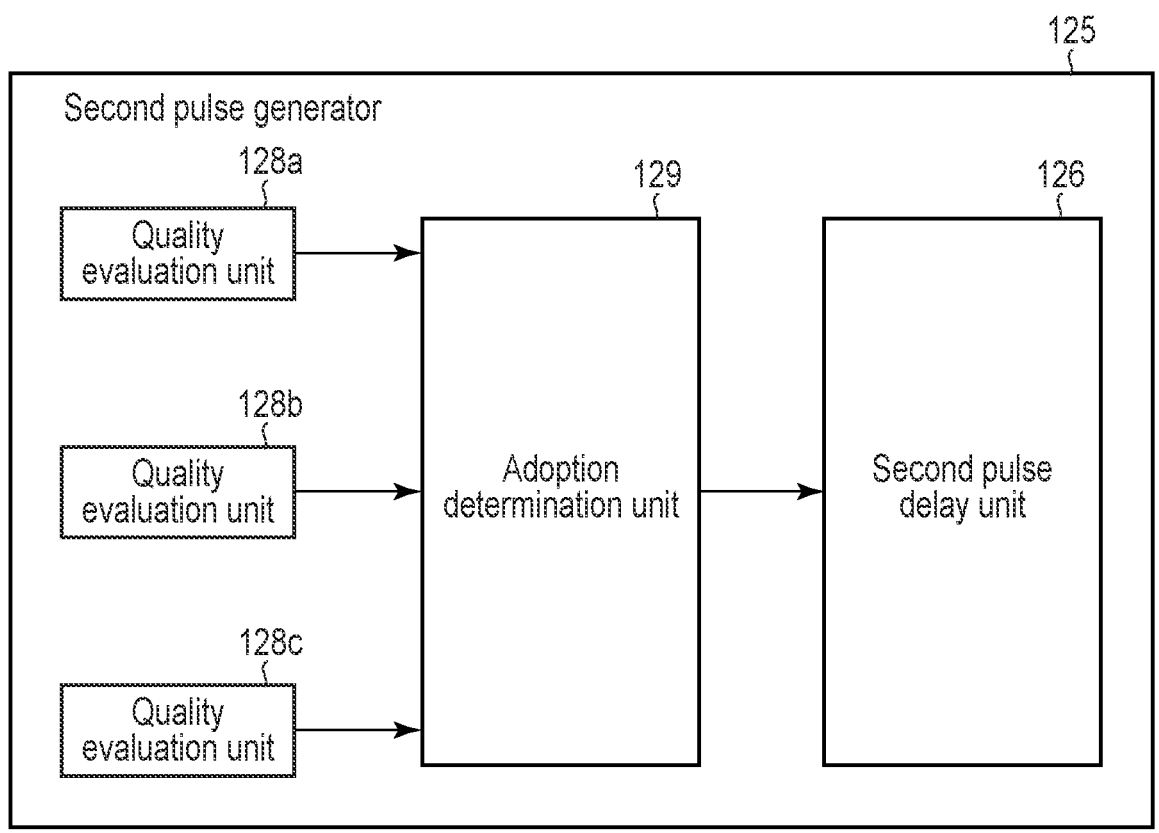
FIG. 7 is a block diagram illustrating a configuration example of a second pulse generator of the wireless receiver according to the embodiment.

FIG. 7 illustrates a configuration in which the second pulse generator 125 further includes quality evaluation units 128a to 128c and an adoption determination unit 129. The number of quality evaluation units 128 provided is equal to the number of times of the wireless transmitter 11 transmitting the signal including the control data in one control cycle. FIG. 7 illustrates a configuration corresponding to a case where the wireless transmitter 11 transmits the signal including the control data three times in one control cycle. FIG. 7 illustrates the configuration in which the second pulse generator 125 includes the quality evaluation units 128a to 128c and the adoption determination unit 129. The embodiment is not limited to this. The quality evaluation units 128a to 128c and the adoption determination unit 129 may be provided separately from the second pulse generator 125.

The quality evaluation unit 128a calculates an error between the reception timing of the signal including the control data transmitted at the first transmission timing and the expected first reception timing of the signal including the control data. The expected reception timing is estimated based on the time from the output of the cycle start signal to the reception of the signal including the control data in the plurality of previous control cycles among the control cycles. That is, the expected first reception timing of the signal including the control data can be estimated based on the time taken from the output of the cycle start signal in a plurality of previous control cycles among the control cycles to the first reception of the signal including the control data. The calculated error is transmitted to the adoption determination unit 129.

Similarly, the quality evaluation unit 128b calculates an error between the reception timing of the signal including the control data transmitted at the second transmission timing and the expected second reception timing of the signal including the control data. The calculated error is transmitted to the adoption determination unit 129.

Further, the quality evaluation unit 128c calculates an error between the reception timing of the signal including the control data transmitted at the third transmission timing and the expected third reception timing of the signal including the control data. The calculated error is transmitted to the adoption determination unit 129.

When the adoption determination unit 129 receives each error output from the quality evaluation units 128a to 128c, the adoption determination unit compares each error and determines that the reception timing of the signal including the control data corresponding to the smallest error is used to synchronize the control timing. For example, when it is determined that the second reception timing of the signal including the control data has the smallest error from the expected reception timing and is used for synchronization of the control timing, the second pulse generator 125 executes the above-described first to fourth pulse generation processes based on the reception notification signal generated in response to the reception of the signal including the control data transmitted at the second transmission timing, and thus it is possible to perform the timing synchronization with the wireless transmitter 11.

In addition, the reception notification signal in the embodiment described above may be replaced with a timing signal indicating that the control data is output from the second wireless module 121 to the second data processor 123. In this case, a circuit of detecting the output of the above-described control data and outputting the timing signal to the second pulse generator 125 is desirably disposed between the second wireless module 121 and the second data processor 123. According to this, for example, even when it is not possible to receive the preamble of control data, it is possible to output the timing signal corresponding to the reception notification signal.

Figure 8:
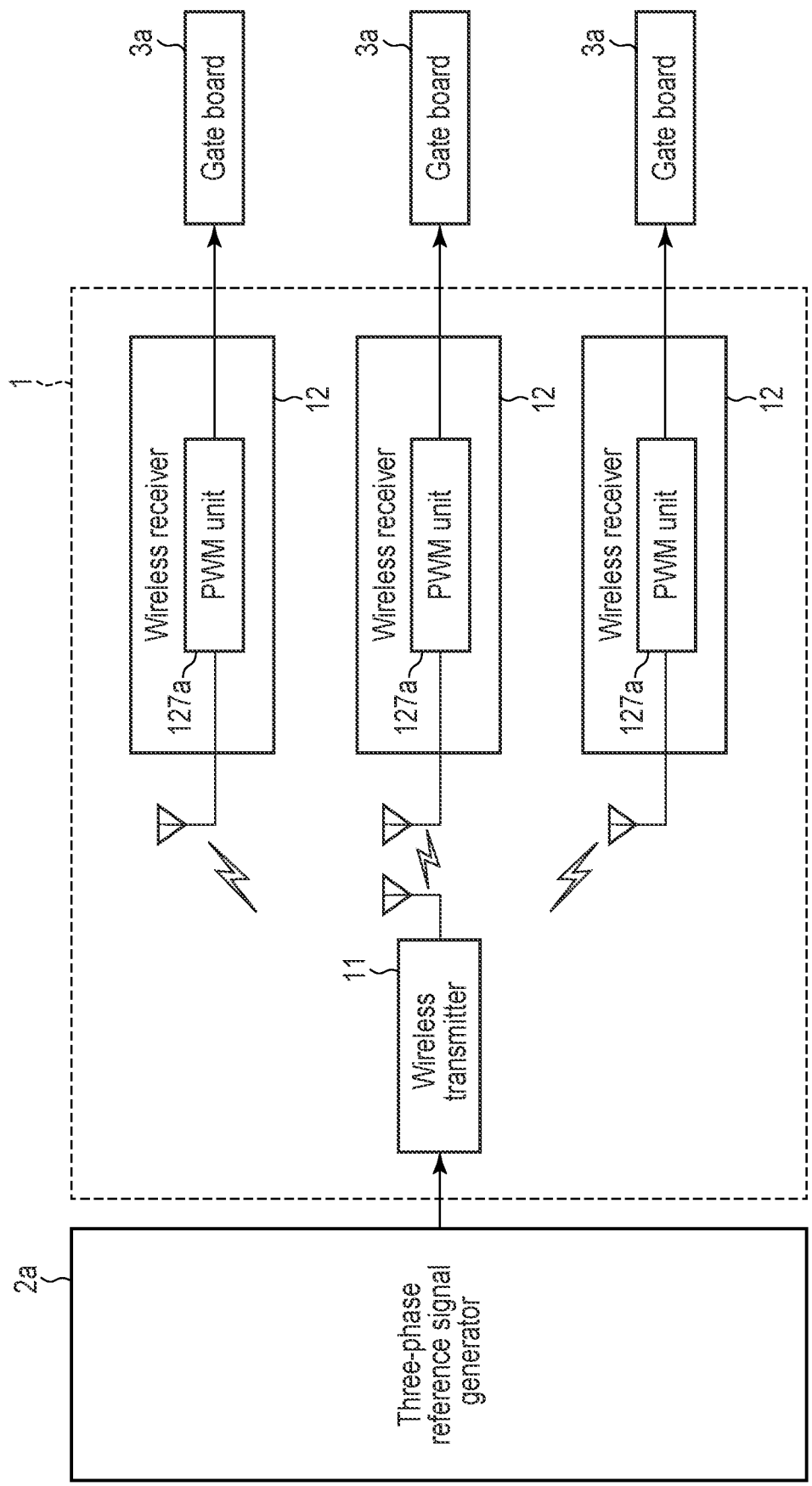
FIG. 8 is a schematic diagram illustrating a configuration example of an electronic system including an electronic apparatus according to the embodiment.

FIG. 8 is a schematic diagram illustrating a configuration example of an electronic system including the electronic apparatus 1 according to the embodiment. As illustrated in FIG. 8, the electronic system includes a three-phase reference signal generator 2a corresponding to a sensing device 2, an electronic apparatus 1 including a wireless transmitter 11 and a wireless receiver 12, and a gate board 3a of an inverter corresponding to the control target device 3. A PWM unit 127a in the wireless receiver 12 corresponds to the second controller 127.

In the electronic system illustrated in FIG. 8, a three-phase reference signal generated by the three-phase reference signal generator 2a corresponds to the sensing data. A signal including the control data, which is generated based on the three-phase reference signal is transmitted from the wireless transmitter 11 to the wireless receiver 12. The PWM unit 127a performs pulse width modulation on the control data included in the signal transmitted from the wireless transmitter 11, and outputs the modulated signal to the gate board 3a of the inverter. The gate board 3a of the inverter is driven in accordance with the control from the electronic apparatus 1. The electronic system illustrated in FIG. 8 is an example of a system including the electronic apparatus 1 according to the embodiment. The radio device 1 according to the embodiment can be applied to various systems. FIG. 8 illustrates a case where three wireless receivers 12 are provided for one wireless transmitter 11. The wireless transmitter 11 and the wireless receiver 12 may be provided so as to be one-to-one.

According to the embodiment described above, it is possible to provide an electronic apparatus 1 capable of suppressing deterioration of the synchronization accuracy between the wireless transmitter 11 and the wireless receiver 12 and an electronic system including the electronic apparatus 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus that controls an operation of a control target device, the electronic apparatus comprising:
a first pulse generation circuit configured to generate a first timing signal;
a delay circuit configured to delay the first timing signal by a first time and generate a second timing signal for defining a transmission timing of control data related to control of the operation of the control target device;
a first wireless communication circuit configured to transmit a data signal including the control data based on the second timing signal;
a second wireless communication circuit configured to receive the data signal and generate a third timing signal for notification of reception of the data signal; and
a second pulse generation circuit configured to generate a fourth timing signal indicating a control timing of the control target device based on the control data, based on the third timing signal.

2. The electronic apparatus of claim 1, wherein the second pulse generation circuit is configured to generate the fourth timing signal by elapse of a predetermined time from reception of the third timing signal, the predetermined time being set based on a period of each of control cycles related to the control of the operation of the control target device and a time from when the first timing signal is output until the third timing signal is received.

3. The electronic apparatus of claim 1, wherein the second pulse generation circuit is configured to:
calculate an average time from an output of the first timing signal to reception of the third timing signal in control cycles related to the control of the operation of the control target device, and
generate the fourth timing signal by elapse of a predetermined time set based on the average time, from reception of the third timing signal in a first control cycle among the control cycles.

4. The electronic apparatus of claim 1, further comprising:
a counting circuit configured to measure an elapsed time in control cycles related to the control of the operation of the control target device,
wherein the second pulse generation circuit is configured to:
calculate an average time from an output of the first timing signal to reception of the third timing signal in the control cycles,
correct a count value of the counting circuit based on a difference between the average time and a time from the output of the first timing signal to the reception of the third timing signal in a first control cycle among the control cycles, and generate the fourth timing signal when the corrected count value reaches a count value corresponding to a period of each of the control cycles.

5. The electronic apparatus of claim 1, further comprising:
a counting circuit configured to measure an elapsed time in control cycles related to the control of the operation of the control target device,
wherein the second pulse generation circuit is configured to:
  calculate an average time from an output of the first timing signal to reception of the third timing signal in the control cycles,
  change a frequency of a clock input to the counting circuit based on a difference between the average time and a time from the output of the first timing signal to the reception of the third timing signal in a first control cycle among the control cycles, and
  generate the fourth timing signal when the count value of the counting circuit in response to an input of the clock having the changed frequency reaches a count value corresponding to a period of each of the control cycles.

6. The electronic apparatus of claim 1, wherein:
the first wireless communication circuit is configured to transmit the data signal a plurality of times during a period of each of control cycles related to the control of the operation of the control target device, and
the second wireless communication circuit is configured to generate the third timing signal in response to reception of the data signal received first from among the data signals transmitted the plurality of times.

7. The electronic apparatus of claim 1, wherein the second wireless communication circuit is configured to estimate a timing for receiving the data signal in a first control cycle among control cycles related to the control of the operation of the control target device, based on a time from an output of the first timing signal to reception of the data signal in the control cycles.

8. The electronic apparatus of claim 7, wherein:
the first wireless communication circuit is configured to transmit the data signal a plurality of times during a period of each of the control cycles, and
the second wireless communication circuit is configured to generate the third timing signal in response to reception of the data signal having a smallest error in the estimated reception timing from among the data signals.

9. The electronic apparatus of claim 1, wherein the first pulse generation circuit is configured to generate the first timing signal for each of control cycles related to the control of the operation of the control target device.

10. The electronic apparatus of claim 1, wherein:
each of the first pulse generation circuit, the delay circuit, the first wireless communication circuit, the second wireless communication circuit, and the second pulse generation circuit comprises hardware, and
a time from an output of the first timing signal to reception of the third timing signal is constant in control cycles related to the control of the operation of the control target device.

11. An electronic system comprising:
the electronic apparatus of claim 1; and
an inverter configured to drive in accordance with control from the electronic apparatus,
wherein the control target device is the inverter.

12. An electronic apparatus that controls an operation of a control target device, the electronic apparatus comprising:
a first processor configured to:
  generate a first timing signal; and
  delay the first timing signal by a first time and generate a second timing signal for defining a transmission timing of control data related to control of the operation of the control target device;
a first wireless communication circuit configured to transmit a data signal including the control data based on the second timing signal;
a second wireless communication circuit configured to receive the data signal and generate a third timing signal for notification of reception of the data signal; and
a second processor configured to generate a fourth timing signal indicating a control timing of the control target device based on the control data, based on the third timing signal.

13. A method that controls an operation of a control target device, the method comprising:
generating a first timing signal;
delaying the first timing signal by a first time and generating a second timing signal for defining a transmission timing of control data related to control of the operation of the control target device;
transmitting a data signal including the control data based on the second timing signal;
receiving the data signal and generating a third timing signal for notification of reception of the data signal; and
generating a fourth timing signal indicating a control timing of the control target device based on the control data, based on the third timing signal.

* * * * *